Oct. 22, 1935.        F. J. SPANG        2,017,994
PIPE JOINT
Filed Jan. 12, 1932        2 Sheets-Sheet 1
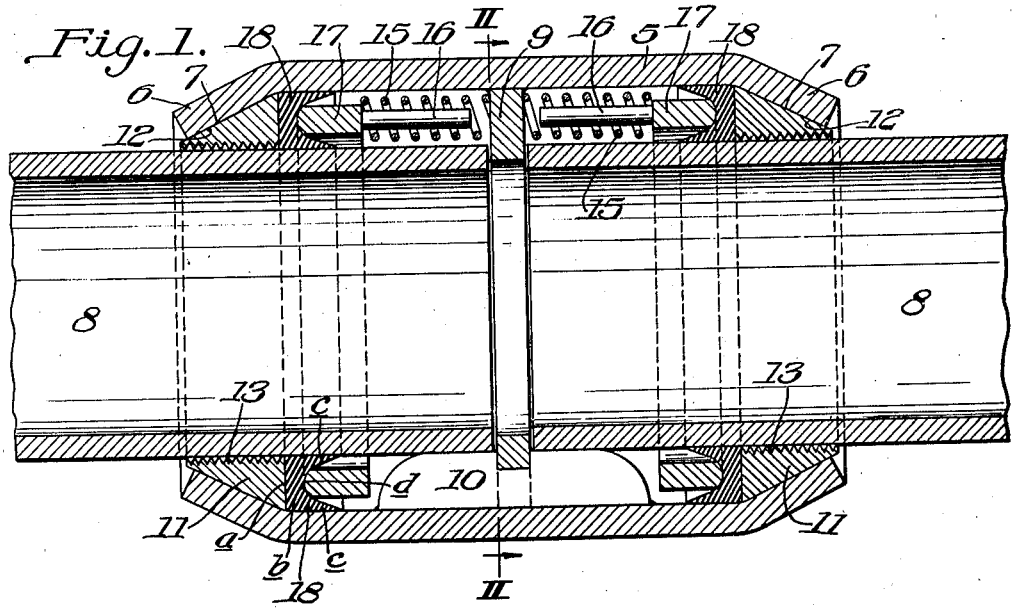
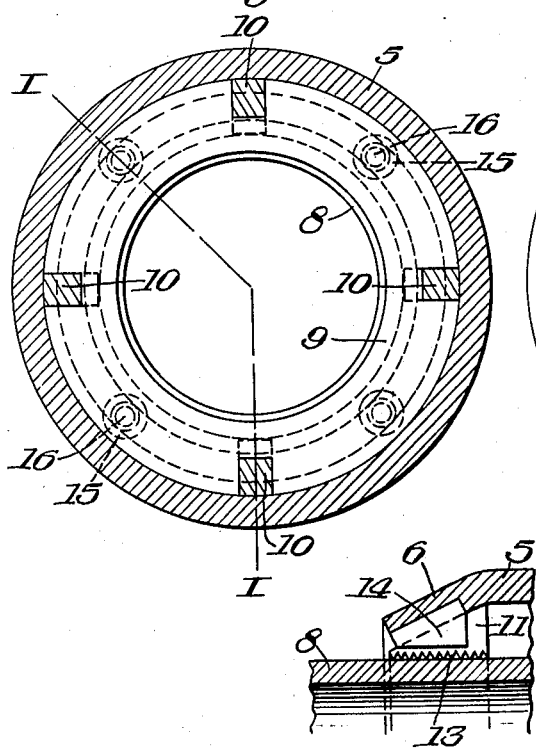
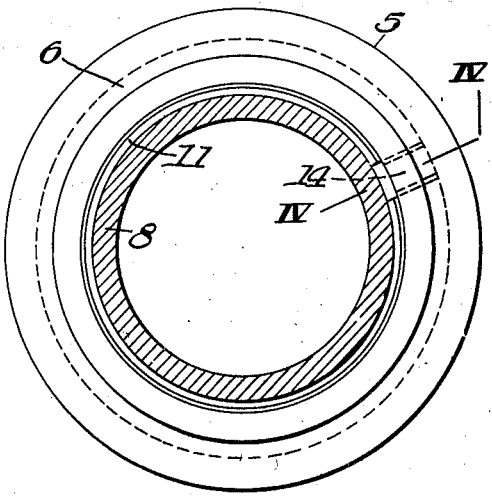
INVENTOR.
F. J. Spang
BY
ATTORNEY.

Oct. 22, 1935.  F. J. SPANG  2,017,994
PIPE JOINT
Filed Jan. 12, 1932  2 Sheets-Sheet 2
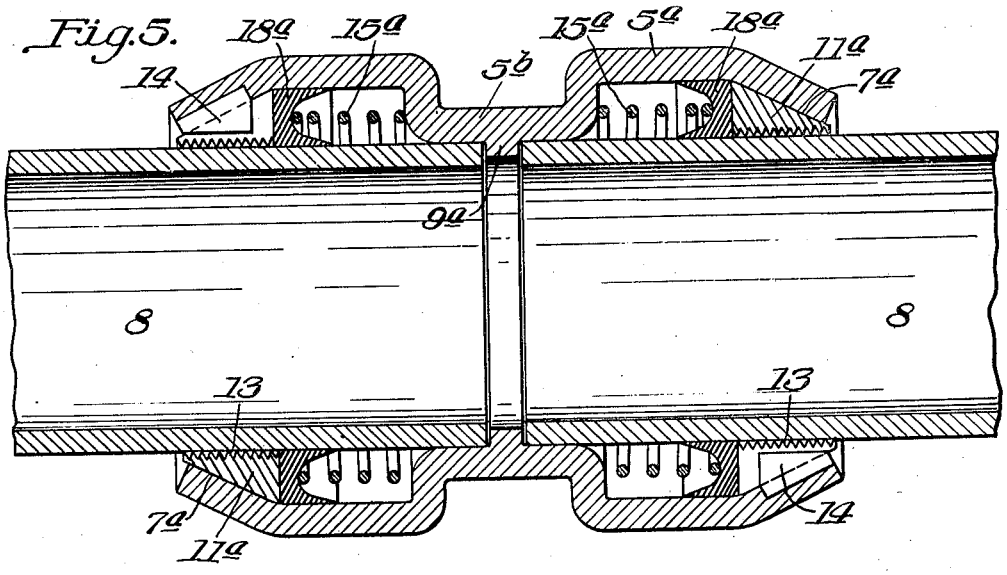
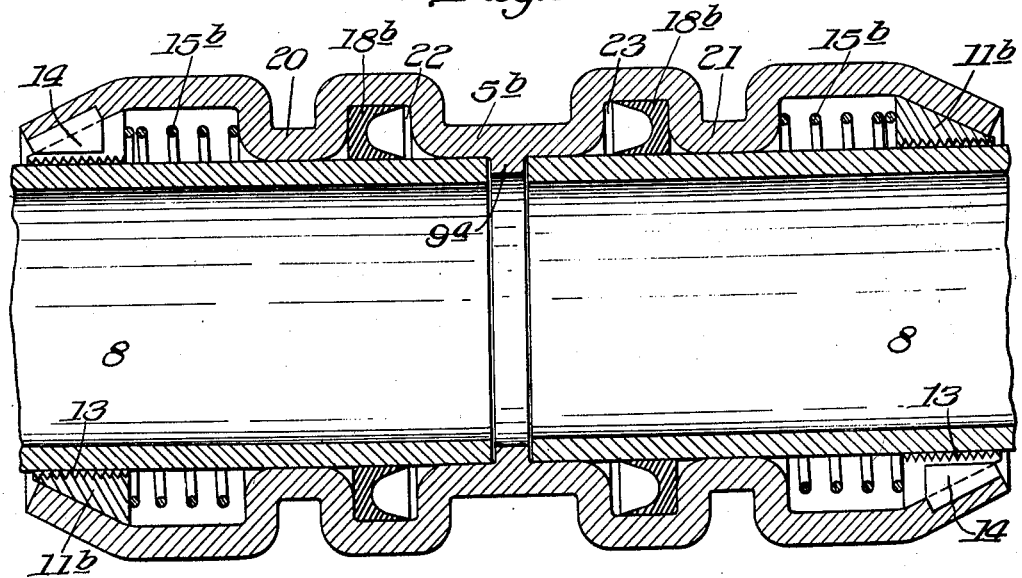
INVENTOR.
F. J. Spang
BY
ATTORNEY.

Patented Oct. 22, 1935

2,017,994

UNITED STATES PATENT OFFICE 2,017,994

PIPE JOINT

Ferdinand J. Spang, Butler, Pa.

Application January 12, 1932, Serial No. 586,118

6 Claims. (Cl. 285—196)

This invention relates to pipe joints or couplings, particularly designed for connecting the adjacent ends of pipe sections employed in gas and oil lines and the like, wherein pressure is present.

The prime object of the present invention is, to provide a simple and efficient joint of the character stated that may be readily applied to adjacent pipe sections and embodying means for the prevention of leakage, the allowance of longitudinal expansion and contraction of the sections, preventing the pulling out of the sections from the joint and for preventing undo movement of the joint on the pipe.

A further object of the present invention is to provide, in a unitary joint structure, means for yieldingly connecting the adjacent ends of pipe sections to the joint, combined with sealing means operable by the pressure in the line for preventing leakage at the joint.

In the accompanying drawings, which illustrate applications of my invention:

Fig. 1 is a longitudinal sectional view of a joint embodying my invention, showing its application to the ends of the adjacent pipe sections, the section being taken on line I—I of Fig. 2;

Fig. 2, a transverse section on line II—II of Fig. 1;

Fig. 3 an end view of the joint;

Fig. 4 a detail sectional view taken on line IV—IV of Fig. 3;

Fig. 5 a longitudinal sectional view of a modified form of my invention; and

Fig. 6 a view similar to Fig. 5 showing a still further modification.

Referring to the drawings, 5 designates the casing or body of the joint or coupling. This element in the form of Fig. 1 comprises a tubular body having its end portions 6 contracted to provide interior inclined contacting surfaces or bearings 7. 8 designates adjacent pipe sections of a fluid line as oil or gas and as shown the adjacent ends of the said sections when coupled together within the joint are designed to be spaced a slight distance apart. In addition to the inclined bearings 7, the interior of the casing is provided with a pipe stop 9 and pipe guide or centering members 10. As illustrated, the pipe stop comprises a ring member positioned within the casing and secured thereto by welding or otherwise, and the guide members 10 are sheet metal elements notched to engage member 9, and are adapted to have the end portions thereof welded to the interior of the casing or elongated sleeve 5.

Located within the casing and designed to cooperate with the inclined portions or contacting surfaces 7, I provide adjustable, yielding and/or movable pipe engaging members 11. The function of members 11 is to yieldingly connect the adjacent ends of the pipe sections to the joint and, as shown, are in the form of metallic rings or slips, either in the form of a split ring or made up in sections, and formed on their peripheries with inclined contacting faces 12 designed, when positioned, to cooperate with the inclined bearing faces 7 of the body and having internal toothed or serrated portions 13 for gripping the pipe ends when the lattter are entered in the joint. When positioned within the casing, the slips 11 are prevented from rotating or partially rotating with respect to the casing by means of a key 14 engaging a slip and the casing.

Designed for cooperation with the slips or members 11, I provide a series of springs 15. Springs 15, which are mounted on pins 16 carried by cages 17, are adapted to exert an outward pressure on the slips located at opposite ends of the body.

In the form of Fig. 1, I have provided fluid sealing means located between the inner ends of the respective slips and the outer edges of the cages 17. The fluid sealing means illustrated comprise self-sealing packing cup rings 18 made of some suitable elastic material and of such configuration that they will readily respond to the pressure in the line for effecting a fluid seal. As shown, the packing cups 18 are formed with a flat contacting face $a$, a rounded grooved portion $b$, and projecting flanges $c$, and are so positioned that upon the insertion of the pipe ends, the rings embrace the outer surface of the pipe and have the outer faces thereof in close contact with the inner ends of the slips, and the flanges thereof in sealing contact with the interior of the joint body and the exterior surfaces of the pipes.

In order to reduce wear, the edges $d$ of the cage contacting with the groove of the ring is rounded. It will be noted that the springs interposed between the stop and the cage are designed to exert an outward pressure against the packing cups and through them to the slips, whereby a sufficient gripping of the pipe ends by the slips is effected to provide the desired connection between the joint and pipe ends.

The internal diameter of the slips relative to external diameter of the pipe ends is such as to provide a metal-to-metal contact and an effective frictional engagement between said parts to prevent the pipe ends from pulling free of the joint under all conditions of use. The construction permits of a removal of the joint or coupling from the pipe line by rotating the body or casing on the pipe while the pipe end is held stationary.

In the form of Fig. 5, I have shown a modified form of casing and a construction in which the cage and the separable guide members 10 are omitted. In this form, the casing 5a is formed with a centrally disposed inwardly extending portion 5b having formed therewith or secured thereto a pipe stop 9a, and in place of the small springs 15 of the form of Fig. 1, I employ large coiled springs 15a arranged within the casing and disposed between the interior walls 19 and the self-sealing resilient elements 18a. In this form, the movable pipe-engaging elements or slips 11a designed to cooperate with the inclined bearing faces 7a are retained, and the portion 5b functions to guide the pipe ends.

In the form of Fig. 6, which shows a still further modification, the casing is formed with the centrally disposed inwardly extending portion 5b and, in addition thereto, with slightly smaller intermediate inwardly extending portions 20 and 21.

This construction, it will be noted, forms channel-like spaces 22 and 23 into which the self-sealing elements 18b are disposed. In this form, the springs 15b come into direct contact with the movable pipe engaging elements 11b but act, as in the other forms, to exert a pressure outwardly against the elements 11b.

The pipe sections may be readily inserted into the opposite ends of the joint by passing the ends thereof through the pipe engaging elements which, as heretofore pointed out, have their internal diameters of a size to frictionally engage the outer wall surfaces of the pipe sections. The adjacent ends of the sections extend into the joint to the pipe stop or adjacent thereto. After the insertion of the pipe ends into closely contacting engagement with the internally toothed or serrated slips and after pressure is applied to the line, the toothed portions of the movable slips bite into the pipe ends sufficiently to form threads on the pipe ends or portions thereof. The formation of these threads on the pipe ends, which co-act with the threads of the slips, enables the pipe ends to be disconnected from the joint by turning the joint while maintaining the pipe end stationary.

In the operation of backing out the pipe, it will be evident that the threads on the slips exert sufficient force on the pipe to lead it out and actually do form tight threads on the pipe ends being backed out.

It is to be noted that with my construction I am enabled to join and seal the adjacent pipe sections having plain ends without the employment of extra coupling devices or burying the pipe line, as is the usual practice.

I claim:

1. A pipe joint including a casing element having a pipe stop interior thereof and pipe centering means, a longitudinally movable spring pressed element within the casing and cooperating therewith for yieldingly connecting a pipe section to the joint, and a self-sealing cup-packing element within the casing engaging the outer surface of a pipe section entered therein and the interior of the casing.

2. A pipe joint including a tubular casing element having a contracted end portion, an elongated metallic pipe gripping slip longitudinally movable within the casing in engagement with the contracted end portion, a spring for exerting pressure on the slip longitudinally of the casing element, and resilient sealing means engaging the interior wall of the casing and adapted to engage an outer wall of a pipe section entered in the casing.

3. A pipe joint including a casing element having contracted end portions, pipe centering means on the interior of the casing, pipe gripping slips longitudinally movable within the casing in engagement with the contracted end portions, resilient sealing means engaging the interior wall of the casing and adapted to engage outer walls of the pipe sections being joined, and springs for exerting pressure on the slips in a direction longitudinally of the casing element.

4. A pipe joint including a casing element having a contracted end portion formed with an interior longitudinally extending tapered face, a spring pressed pipe gripping slip within the casing having a tapered face in engagement with the tapered face of the contracted end portion, resilient cup-sealing means engaging the interior wall of the casing and adapted to engage an outer wall of a pipe section entered in the casing, and means for preventing rotation of the slip, said slip having a serrated portion for engagement with a pipe section.

5. A pipe joint including a casing element having contracted end portions, a pipe stop interior thereof, pipe gripping slips within the casing in engagement with the contracted end portions, resilient sealing means in contact with the slips and engaging the interior wall of the casing and adapted to engage an outer wall of a pipe section entered in the casing, and springs exerting a pressure against the sealing means and said slips.

6. A pipe joint including a casing element having a contracted end portion formed with an interior elongated longitudinally extending tapered face, a movable pipe gripping slip having a tapered face for engagement with the first tapered face disposed within the casing and positioned to be subjected to fluid pressure in a pipe line having pipe sections entered in the casing element to effect a wedging action, said slip having a serrated face for engaging a pipe section, and a spring within the casing also exerting pressure on the slip.

FERDINAND J. SPANG.